No. 719,291. PATENTED JAN. 27, 1903.
W. C. ALLEN.
AGRICULTURAL IMPLEMENT.
APPLICATION FILED MAY 19, 1902.
NO MODEL.

Witnesses
Geo. H. Byrne
Fred W. Engleit

Inventor
W. C. Allen.
By Williamson
Attorneys

UNITED STATES PATENT OFFICE.

WILLIAM C. ALLEN, OF BUFORD, GEORGIA.

AGRICULTURAL IMPLEMENT.

SPECIFICATION forming part of Letters Patent No. 719,291, dated January 27, 1903.

Application filed May 19, 1902. Serial No. 108,098. (No model.)

*To all whom it may concern:*

Be it known that I, WILLIAM C. ALLEN, a citizen of the United States, residing at Buford, in the county of Gwinnett and State of Georgia, have invented certain new and useful Improvements in Agricultural Implements; and I do hereby declare the following to be a full, clear, and exact description of the invention, such as will enable others skilled in the art to which it appertains to make and use the same.

My present invention relates to improvements in agricultural implements, and I have shown the same as embodied in a hoe, as will be readily seen.

Among the objects of my said invention is to provide such an implement in which the handle and the blade of the implement are separable, allowing the two parts to be readily detached, either for the purpose of substituting a new blade to replace a worn one or for the purpose of inserting a blade of a different shape. In this way one handle may be utilized for a number of different blades, thus combining the utility of a number of agricultural implements in virtually one device.

In order that my said invention may be more clearly understood, reference will be had to the accompanying drawings, wherein—

Figure 1:
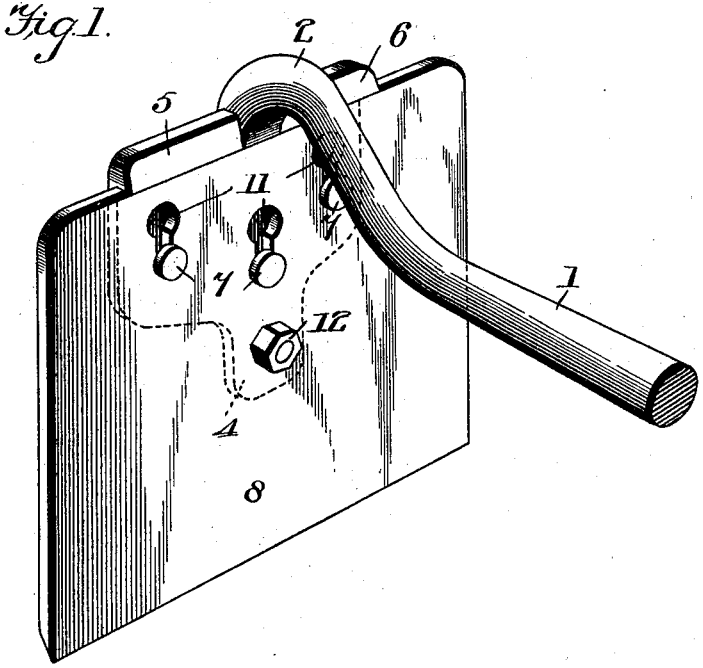
Figure 2:
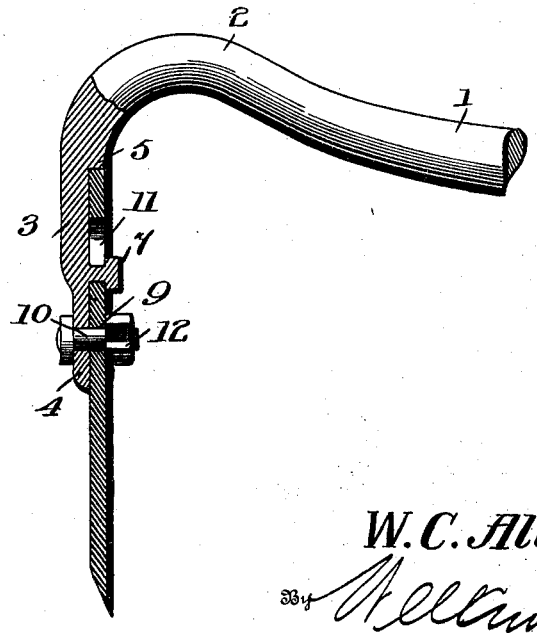

Figure 1 is a view showing the device carrying a hoe-blade in perspective, and Fig. 2 is a central vertical sectional view taken transversely through the same.

In the views, 1 designates the handle of the implement, having the usual upturned portion 2 and the downwardly-depending portion 3. This portion 3 is made somewhat wider than is usual in the construction of this class of tools and ultimately terminates in the perforated extension 4. Upon the top of this flat portion 3 is formed a pair of overhanging shoulders 5 6. The front face of this portion 3 is preferably faced off perfectly flat. Extending laterally from this flat portion 3 are a plurality of lugs 7, having enlarged heads upon their ends.

8 represents the blade of the implement. This blade 8 is perforated at 9 to receive the bolt 10 and provided near the upper portion thereof with the elongated perforations 11, having one end thereof enlarged to allow the passage of the heads upon the lugs 7. This blade 8 is brought into such a position that the enlarged heads upon the lugs 7 pass through the enlarged portions of the openings 11. The blade is then forced upwardly until its upper edge abuts against the overhanging shoulders 5 6. The bolt 10 is then passed through the perforation in the extension 4 and through the perforation 9 in said blade. The lugs 7 at this time will be firmly seated in the lower narrow portion of the openings 11 in said blade, thereby holding the same firmly against the face of the portion 3 of the handle. The nut 12 may now be screwed upon the end of the bolt 10, firmly securing said blade against sliding, the blade being now firmly locked in place against displacement.

While I have shown my invention as applied to a hoe, it will be understood that I do not so confine myself, as this same invention may be employed in various connections where a device of this character is desirable.

Having thus described my said invention, what I claim, and desire to secure by Letters Patent of the United States, is—

1. In an agricultural implement, the combination with a handle, an enlarged end portion carried thereby having shoulders at its upper end, and lugs projecting laterally from the face thereof; of a blade having openings adapted to receive said lugs, said blade being adapted to be slid up against said shoulders, and means for locking said blade against sliding.

2. In an agricultural implement, the combination with a handle, an enlarged end carried thereby, a plurality of lugs having enlarged heads projecting laterally from the face thereof, and overhanging shoulders formed at the top of said enlarged portion; of a perforated blade adapted to fit over said lugs, and to abut against said shoulders, and means for retaining said blade in such position.

3. In an agricultural implement, the combination with a handle having an enlarged end portion, a pair of shoulders formed at the top of said end portion, a plurality of lugs having enlarged heads projecting laterally from the face of said end portion, and a perforated depending portion extending downwardly from said enlarged portion; of a blade having a plurality of perforations adapted to register with the lugs upon said enlarged portion, said blade being slipped on over said lugs and resting with its upper edge abutting against said shoulders, and a bolt adapted to pass through said perforated extension and through said blade firmly locking the parts against movement.

In testimony whereof I affix my signature in presence of two witnesses.

WILLIAM C. ALLEN.

Witnesses:
 L. A. WILLBANKS,
 E. C. HAYS.